Oct. 9, 1951  E. M. O'C. HONEY ET AL  2,570,677
BATTERY SEPARATOR
Filed July 30, 1948  2 Sheets-Sheet 1

Inventors
E. M. O'C. Honey
C. R. Hardy

Oct. 9, 1951 — E. M. O'C. HONEY ET AL — 2,570,677
BATTERY SEPARATOR
Filed July 30, 1948 — 2 Sheets-Sheet 2

Inventors
E. M. O'C. Honey
C. R. Hardy
By Glascock Downing &c., Attys

Patented Oct. 9, 1951

2,570,677

UNITED STATES PATENT OFFICE 2,570,677

BATTERY SEPARATOR

Eric Maurice O'Conor Honey and Charles Rupert Hardy, Dagenham Dock, England, assignors to Pritchett & Gold and E. P. S. Company Limited, Dagenham Dock, England, a British company Application July 30, 1948, Serial No. 41,634
In Great Britain June 9, 1947

2 Claims. (Cl. 136—147)

This invention relates to separators for the plates of electrical storage batteries, and has for its object to provide an improved type of separator which protects the negative plate, especially at its edges, from contact with the positive plate, and from deposition of antimony from the lead alloy used in the positive plate.

According to our invention we enclose each negative plate in an envelope of micro-porous material, with only the current carrying lugs protruding.

The envelope is made of sheets of micro-porous material, preferably polyvinyl chloride. The polyvinyl chloride is rendered micro-porous by mixing it with finely divided particles of starch and a solvent constituting a temporary plasticiser resulting in the production of a dough which is extruded as a strip, the solvent being then removed by evaporation and the extruded strip treated with a hot liquid capable of swelling the starch particles to increase the dimensions of the strip, which is then passed through hot acid to digest the starch, whereupon the strip returns to approximately its original dimensions, and is washed and dried. These sheets are usually ribbed on one side, and we form the envelope with the ribbed side of the sheet on the outside, and with the flat surface on the interior in contact with the plate.

A small clearance is left between the edge of the plate and the envelope to avoid accumulation of gas during charge. There is then no objection to the envelope pressing tightly on the face of the negative plate, and gas can escape at the point where the lug protrudes from the envelope.

In making the envelope we may join the edges of the micro-porous sheets by folding or inserting strips of similar material, and sealing by the use of a suitable acid resisting cement. Alternatively, the joint may be welded, for instance by electronic heating.

We may place a wood veneer, say 0.01" thick, on each face of the plate before inserting it in the envelope. Although somewhat reducing diffusion and increasing resistance the presence of the wood veneers can help to maintain the negative plates in a healthy condition.

To avoid damage to the bottom of the envelope due to vibration which might cause the bottom of the plate to cut through the envelope, we may reinforce the bottom of the envelope by inserting a strip of the same or other acid-resisting material. We may also extend the upper edges of the envelopes locally to embrace a portion of the current carrying lugs as a further precaution against short circuit.

Where it is desired to protect the positive plates, we prefer to provide a glass wool sheet on each face of each positive plate. This holds the active material in place but allows said diffusion and gas evolution.

With our improved separators, it is impossible for loose positive active material deposited on the edges of the negative plates to cause a short circuit. It is also more difficult for antimony entering the electrolyte as a result of peroxidation of the positive plate to deposit on the negative plate and so cause loss of charge on open circuit.

Referring to the accompanying explanatory drawings—

Figure 1:
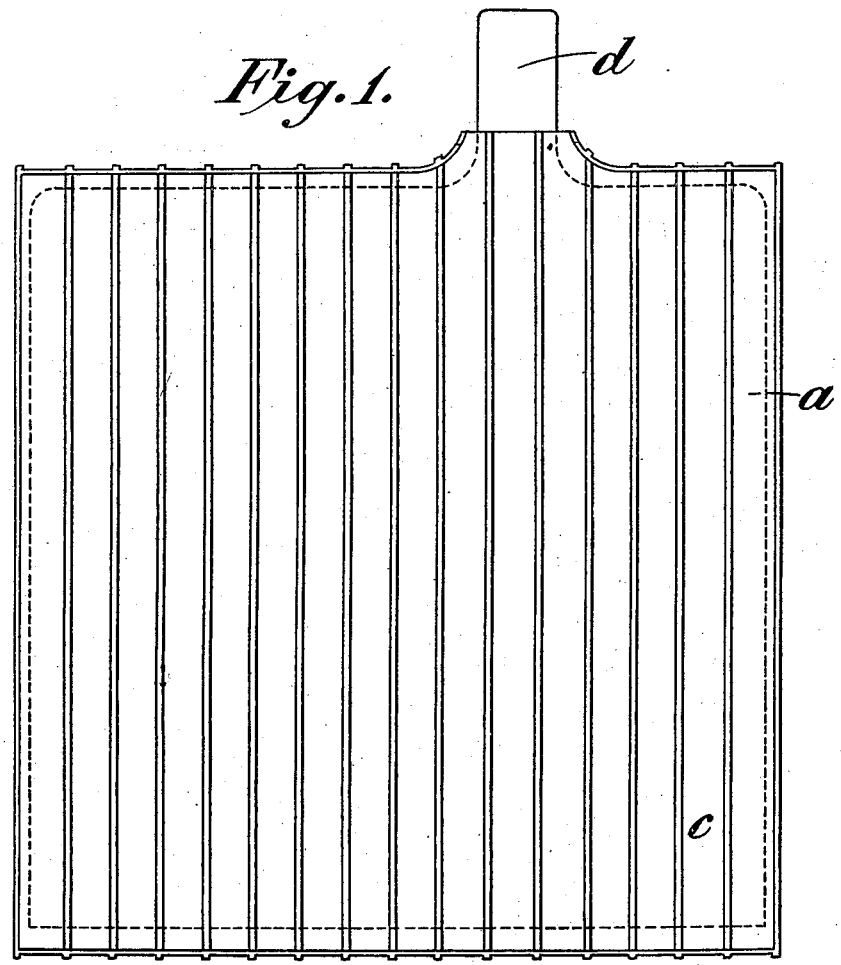
Figure 1 is a front elevation, Figure 2 an end elevation and Figure 3 a plan view of a plate enclosed in an envelope of micro-porous material with only the current carrying lug projecting, in accordance with this invention.
Figure 2:
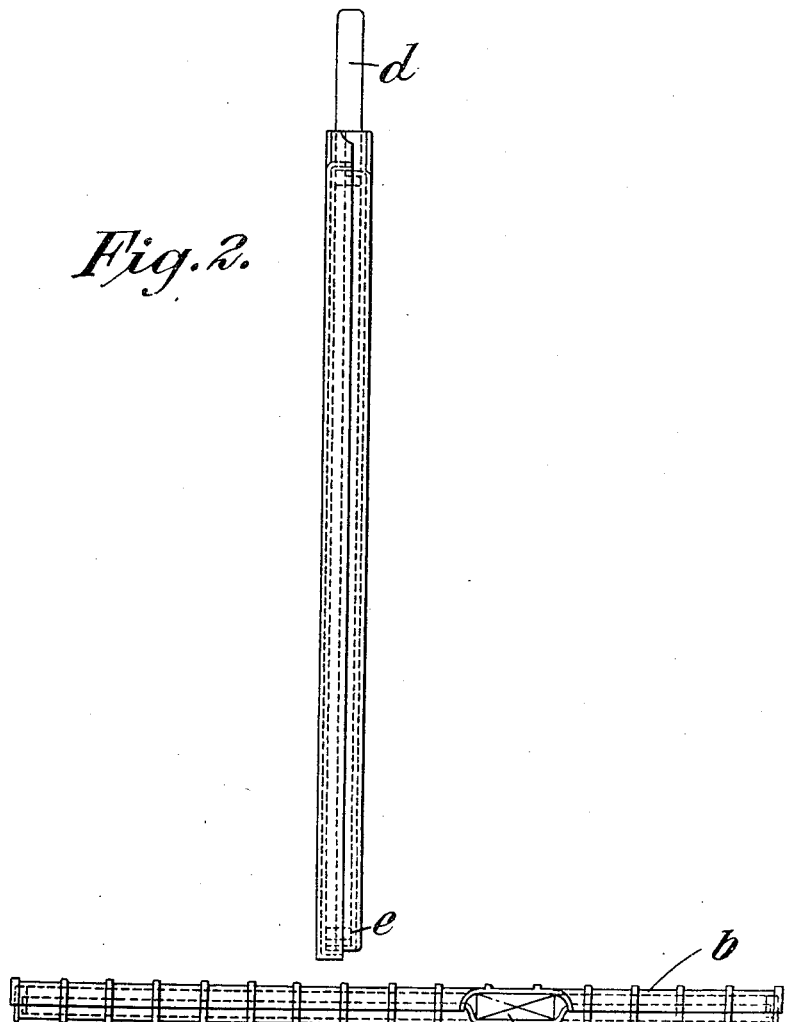
Figure 3:
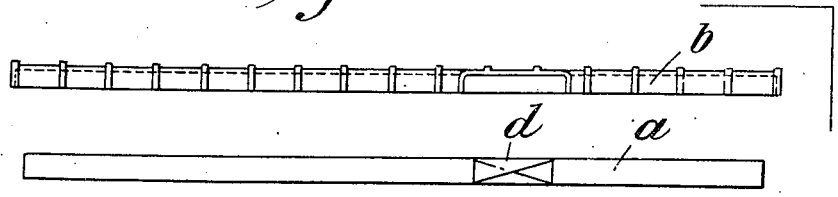
Figure 4:
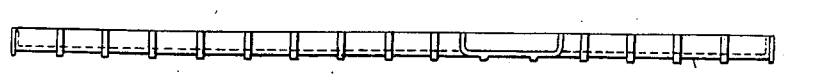
Figure 4 is an exploded plan view showing the plate and the two parts of the envelope separated.

The plate $a$ is enclosed in an envelope of micro-porous material consisting of two parts $b$ and $c$ shaped or moulded to enclose the plate between them and to overlap at their meeting edges except at the part where the current carrying lug $d$ projects. The envelope is spaced a short distance from the vertical and top edges of the plate and from the lug to allow gas to escape from within the envelope upwards around the lug.

A strip $e$ of micro-porous material is preferably placed between the bottom of the plate and the envelope to prevent damage to the latter by the plate. The strip may be cemented to the inner part of the envelope.

What we claim is:

1. In the separation of the plates of electric storage batteries, enclosing each negative plate in an envelope of micro-porous material with only the current carrying lug projecting, the said envelope having flat internal faces to press against the flat faces of the plate and prevent displacement of active material therefrom but providing a clearance at the vertical and top edges of the plate and at the lug to allow of gas escape around the lug during battery charging.

2. A separator envelope for enclosing a negative plate of an electric storage battery made of micro-porous material and consisting of two parts which fit into one another around the edges of the plate and are cemented or otherwise jointed together, the current carrying lug alone projecting from the envelope, the envelope having flat internal faces to press against the flat faces of the plate to prevent displacement of active material therefrom but providing a clearance at the vertical and top edges of the plate and at the lug to allow of gas escape around the lug during battery charging.

ERIC MAURICE O'CONOR HONEY.
CHARLES RUPERT HARDY.

REFERENCES CITED

The following references are of record in the file of this patent:

UNITED STATES PATENTS

| Number | Name | Date |
|---|---|---|
| 532,128 | Willard | Jan. 8, 1895 |
| 1,422,815 | Beck | July 18, 1922 |
| 1,990,976 | Booss | Feb. 12, 1935 |
| 2,157,629 | Rolph | May 9, 1939 |
| 2,256,105 | Shank | Sept. 16, 1941 |
| 2,371,868 | Berg et al. | Mar. 20, 1945 |
| 2,465,493 | Strickhouser | Mar. 29, 1949 |

FOREIGN PATENTS

| Number | Country | Date |
|---|---|---|
| 111,939 | Australia | Nov. 28, 1940 |
| 194,649 | Great Britain | July 18, 1923 |
| 228,271 | Great Britain | Feb. 2, 1925 |
| 358,466 | Great Britain | Oct. 5, 1931 |
| 362,120 | Great Britain | Dec. 3, 1931 |
| 374,555 | Great Britain | June 16, 1932 |
| 628,908 | Great Britain | Sept. 7, 1949 |